United States Patent
Swoboda et al.

(10) Patent No.: US 9,321,069 B2
(45) Date of Patent: Apr. 26, 2016

(54) SYSTEM FOR PAINTING OBJECTS

(75) Inventors: Werner Swoboda, Boeblingen (DE); Apostolos Katefidis, Gaertringen (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 13/991,728

(22) PCT Filed: Nov. 22, 2011

(86) PCT No.: PCT/EP2011/005869
§ 371 (c)(1),
(2), (4) Date: Jun. 5, 2013

(87) PCT Pub. No.: WO2012/076117
PCT Pub. Date: Jun. 14, 2012

(65) Prior Publication Data
US 2013/0247819 A1    Sep. 26, 2013

(30) Foreign Application Priority Data

Dec. 11, 2010  (DE) .......................... 10 2010 054 212

(51) Int. Cl.
*B05B 15/12*      (2006.01)
*B05C 15/00*      (2006.01)

(52) U.S. Cl.
CPC ......... *B05B 15/1225* (2013.01); *B05B 15/1233* (2013.01); *B05B 15/1244* (2013.01); *B05B 15/1248* (2013.01); *B05B 15/1259* (2013.01); *B05C 15/00* (2013.01); *Y02P 70/36* (2015.11)

(58) Field of Classification Search
None
See application file for complete search history.

(56) References Cited

U.S. PATENT DOCUMENTS

| | | | |
|---|---|---|---|
| 4,371,563 A | | 2/1983 | Muehlberger |
| 5,039,313 A | * | 8/1991 | Gocht ............................... 95/65 |
| 6,905,577 B1 | | 6/2005 | Salama |
| 7,815,714 B2 | | 10/2010 | Taylor et al. |
| 2005/0167078 A1 | | 8/2005 | Katefidis |

FOREIGN PATENT DOCUMENTS

| | | | | |
|---|---|---|---|---|
| DE | 30 33 277 | | 3/1982 | |
| DE | 3033277 | * | 3/1982 | ............... B03C 3/02 |
| DE | 39 14 673 | | 11/1990 | |
| DE | 3914673 | * | 11/1990 | ............... B03C 3/02 |
| DE | 42 25 503 | | 2/1994 | |
| DE | 4225503 | * | 2/1994 | ............ B01D 45/06 |
| DE | 101 34 313 | | 4/2002 | |

* cited by examiner

*Primary Examiner* — Dah-Wei D Yuan
*Assistant Examiner* — Jethro M Pence
(74) *Attorney, Agent, or Firm* — Factor Intellectual Property Law Group, Ltd.

(57) ABSTRACT

A system for painting objects, in particular vehicle bodies or add-on parts, comprising a spray booth in which a paint can be applied to the objects. A fluid flow, which receives overspray and possibly solvent arising during the painting process, passes through the spray booth from the top down. A recovery system for recovering the overspray and possibly the solvent comprises at least one substantially vertical pipe, through which the fluid led out of the spray booth and laden with overspray and possibly solvent can flow and the surface of which is provided with elevations and/or recesses in such a way that eddies form in the fluid flowing through the pipe and the paint overspray is deposited onto the circumferential wall and flows downward out of the pipe.

7 Claims, 2 Drawing Sheets

SYSTEM FOR PAINTING OBJECTS

RELATED APPLICATIONS

This application claims the filing benefit of International Patent Application No. PCT/EP2011/005869, filed Nov. 22, 2011, which claims the filing benefit of German Patent Application No. 10 2010 054 212.1 filed Dec. 11, 2010, the contents of both of which are incorporated herein by reference.

FIELD OF THE INVENTION

The invention relates to a system for painting objects, in particular vehicle bodies or add-on parts, having
a) a spray booth in which a paint can be applied to the objects;
b) a device which generates a stream of a fluid which passes through the spray booth from top to bottom and which receives overspray produced during painting and, where appropriate, solvent;
c) a recovery system for recovering the overspray and, where appropriate, solvent.

BACKGROUND OF THE INVENTION

In the manual or automatic application of paints to objects, a part-stream of the paint, which generally contains both solids and/or binders as well as solvents, is not applied to the object. This part-stream is called "overspray" among experts. In the following, the terms overspray and paint overspray or overspray particles are always understood in the meaning of a disperse system, such as an emulsion or suspension or a combination thereof, which is generally capable of flowing. The overspray is caught by the stream of fluid in the painting booth and fed to a separating operation. The fluid used is air, which, where necessary after suitable conditioning, can be passed back into the coating booth again.

In known painting systems of the type mentioned at the beginning, the overspray and, where appropriate, the solvent contained in the paint are simply recovered by both being left in the first instance in the spray booth and collected in collecting channels. The recovered overspray can then be removed from the collecting channels. A disadvantage is that the paint in the booth is widely scattered and the recovery losses are very high. Solvents are not recovered at all.

An object of the present invention is to configure a system of the type mentioned at the beginning in such a manner that the overspray can be recovered by simple means from the fluid flowing through the spray booth.

SUMMARY OF THE INVENTION

This object may be achieved according to the invention in that
d) the recovery system comprises at least one substantially vertical tube through which the fluid guided out of the spray booth and laden with overspray and, where appropriate, solvent can flow and the surface of which is provided with elevations and/or depressions so that eddies form in the fluid flowing through the tube and the paint overspray is deposited on the peripheral wall and flows downwards out of the tube.

The configuration of the recovery system according to the invention can accordingly be conceived simply: One or more tubes are sufficient. The peripheral wall of which is shaped in a specific manner. The shaping must be such that the fluid flows through the tubes not in a laminar manner but with the formation of eddies. Because the paint overspray is relatively heavy, it is thrown by the eddies against the tube wall, where it adheres and then simply flows downwards under the influence of gravity. The bottom end of the tube can be connected to a paint container, where the recovered liquid overspray collects and can be fed for re-use.

A particularly advantageous embodiment of the invention is that in which the tube can be cooled below a temperature that corresponds to the dew point of the solvent in the fluid flowing through the tube, so that the solvent condenses on the peripheral wall of the tube and, together with the overspray, flows downwards and out of the tube.

By simply cooling the tube, which, in the first instance serves only for the recovery of the overspray, the solvent can additionally also be recovered in the tube. The solvent thereby combines on the peripheral wall of the tube with the overspray adhering thereto and facilitates the downward flow thereof.

The concentration of solvent in the fluid flowing through the tube is advantageously chosen to be so high that the dew point of the solvent is above the freezing point of water. Such concentrations of solvent are above the explosive limit. However, if special explosion-prevention measures, as are known per se, are taken, such solvent concentrations are acceptable. They have the advantage that the dew point can be raised upwards significantly over 0° C., and the tubes do not have to be overly cooled.

The solvent concentration should be over 30 g per standard cubic meter when using butyl acetate and over 10 g per standard cubic meter when using xylene.

When solvents are recovered by cooling the tubes, as described herein, the fluid flowing through the tubes is, of course, also correspondingly cooled. For energy reasons, an embodiment of the invention is therefore recommended in which there is provided a heat pump, which cools the laden fluid flowing through the tube and heats the cleaned fluid again before it is returned to the spray booth. Where particularly high demands are made of the degree of recovery of overspray and of the purity of the fluid discharged to the outside atmosphere, an electrostatic after-filter can be provided downstream of the at least one tube through which laden fluid can flow.

In that case, it is recommended to provide separate paint containers for the overspray obtained in the at least one tube and the overspray obtained in the electrostatic after-filter. The reason for this is that the overspray obtained in the tube contains virtually no cured particles and is suitable for immediate re-use, while it must be expected that crosslinking reactions will have taken place to some extent in the overspray obtained in the electrostatic after-filter. This overspray must therefore be filtered before it is re-used.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention will be described in greater detail below with reference to the drawing, in which.

DETAILED DESCRIPTION OF THE PRESENT INVENTION

Figure 1:
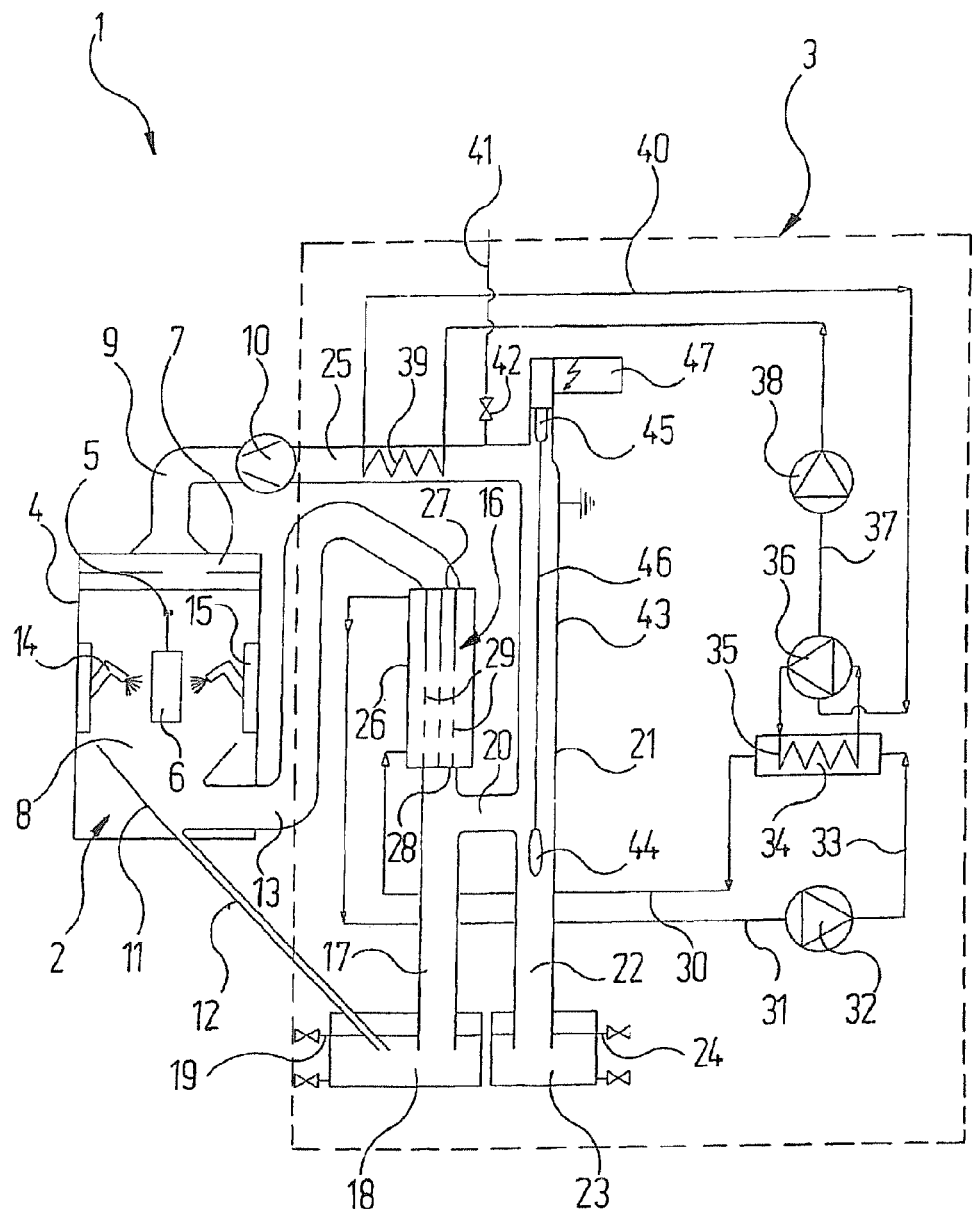
FIG. 1 shows schematically a painting system.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The painting system shown in FIG. 1 and designated generally by the reference numeral 1 comprises as the main components a spray booth 2 and a recovery system 3 for paint overspray and solvent.

The spray booth 2 is of substantially conventional construction. It comprises a housing 4 through which the objects 6 to be painted are guided perpendicularly to the plane of projection of FIG. 1 by means of a conveyor system 5 which is indicated schematically. In the interior of the spray booth 2 there is a fluid atmosphere in the form of air. To that end, a continuous air flow is guided through the interior of the spray booth 2 from an upper air plenum 7 to a lower outlet opening 8, as is known per se. The air is introduced into the air plenum 7 by way of a pipe 9 by means of a fan 10. The outlet opening 8 is delimited by a funnel-shaped guide plate 11, from the base of which there branch a comparatively narrow paint discharge pipe 12 and an air discharge pipe 13.

On both sides of the movement path of the objects 6 to be painted there are application devices 14, 15, by way of which a paint which contains solvent is delivered to the objects 6. Paint overspray and solvent vapours are produced in known manner during the painting operation and are introduced together with the air flow into the funnel-shaped guide plate 11 by way of the outlet opening 8 and are then treated in the manner described below in order to recover paint and solvent.

Air which, as already mentioned above, is laden with paint overspray and solvent vapours is fed from the spray booth 2 to the recovery system 3 by way of the air discharge pipe 13. The air discharge pipe 13 leads to a combination separator 16, the structure of which will be described below. In the combination separator 16, the paint droplets are separated out of the air flow to the greatest possible extent; the solvent vapours condense, and separated paint and condensed solvent flow into a first paint container 18 by way of a pipe 17. The paint discharge pipe 12, which comes from the spray booth 2, also opens into the first paint container 18. A specific level of the paint/solvent mixture is maintained in the paint container 18 by means of an overflow 19; the mouths of both the paint discharge pipe 12 and the pipe 17 coming from the combination separator 16 are located beneath that level.

The air flow already largely freed of solvent and paint particles by means of the combination separator 16 is fed by way of a branch pipe 20 to an electrostatic after-filter 21. The structure of this electrostatic after-filter 21 will also be explained in greater detail below. The paint particles deposited there flow by way of a further pipe 22 into a second paint container 23. A specific level, below which the pipe 22 opens, is also maintained in the second paint container 23 by means of an outlet 24.

The air after-cleaned in the electrostatic after-filter 21 is fed by way of a pipe 25 to the fan 10 and from there by way of the pipe 9 to the air plenum 7 of the spray booth 2, whereby the air circuit is closed.

Figure 2:
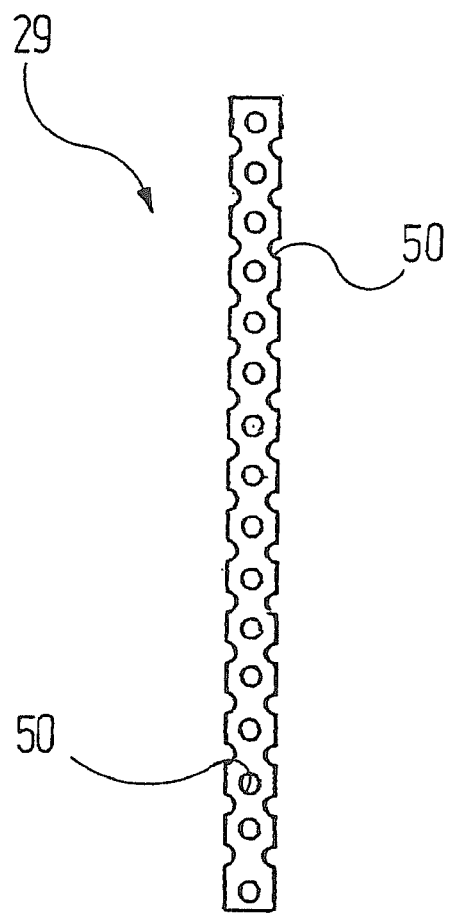
FIG. 2 shows a section of a heat exchanger tube as is used in the system of FIG. 1.

The combination separator 16 has the following construction: In a gas-tight housing 26, a plurality of specially configured heat exchanger tubes 29, which are shown only schematically in FIG. 1 and on a larger scale and in detail in FIG. 2, run parallel to one another from an upper inlet 27 to a lower outlet 28. The heat exchanger tubes 29 are distinguished in that they are shaped by impressions and/or elevations in their peripheral wall, as can be seen in FIG. 2. Such heat exchanger tubes 29 are known per se for a different purpose from DE 10 350 765 B4.

The top ends of the heat exchanger tubes 29 are so connected that their interiors are in communication with the air outlet pipe 13. In a corresponding manner, the bottom ends of the heat exchanger tubes 29 are so connected that their interiors are in communication with the pipe 17 and accordingly also with the branch pipe 20. The air accordingly flows through the interiors on its way through the combination separator 16.

A coolant flows through the interior, located outside the heat exchanger tubes 29, of the housing 26 of the combination separator 16. The coolant is fed to the interior of the combination separator 16 by way of a pipe 30 and is removed from that interior by way of a further pipe 31. The pipe 31 leads to a fan 32 and, from there, by way of a further pipe 33, to a heat exchanger 34. In the heat exchanger 34, the coolant is cooled in a manner which will be described to a temperature that is below the dew point of the solvent flowing through the combination separator 16 in the air.

The heat exchanger 34 contains a cooling device 35, which is connected as a heat source for a heat pump 36. The heat removed from the coolant flowing through the heat exchanger 34 from the pipe 33 to the pipe 30 is fed from the heat pump 36 to a heating circuit, which comprises a fan 38 located in a feed pipe 37, a heating device 39 and a return pipe 40. The heating device 39 is located in the pipe 25 coming from the electrostatic after-filter 21 and heats the air flowing therein again.

Fresh air can additionally be introduced into the pipe 25 by way of a pipe 41, in which a valve 42 is located.

The electrostatic after-filter 21 comprises a tubular metal housing 43, which is earthed. In the axis of the housing 43, a corona wire 46 is clamped between two insulators 44, 45, to which corona wire 46 a high voltage can be applied by means of a high-voltage generator 47.

The painting system 1 described above operates as follows:

The objects 6 to be painted are guided continuously or intermittently through the interior of the spray booth 2, perpendicularly to the plane of projection of FIG. 1, by means of the conveying device 5 and are thereby sprayed with paint by means of the application devices 14, 15. Liquid paint collects in the funnel-shaped guide plate 11 in the manner of a "coarse separation" and is then conveyed directly into the first paint container 18 by way of the paint discharge pipe 12.

However, a considerable portion of the paint overspray is fed in the air stream, together with the solvent vapours released during the painting operation, by way of the pipe 13 to the recovery system 3. The painting system 1 as a whole is thereby operated in such a manner that the concentration of solvent in the air stream reaches a value at which the dew point of the solvent is above the freezing point of water. For example, with butyl acetate as solvent and at a concentration of 30 grams per standard cubic meter, a dew point of about 3° C. is reached. The concentration in question is above the explosive limit, and special precautionary measures for explosion prevention, as are, however, known per se, must therefore be taken.

The following then takes place in the combination separator 16:

The solvent vapours which flow through the heat exchanger tubes 29 are condensed on the peripheral walls of the heat exchanger tubes 29, because the peripheral walls are brought to a temperature that is below the dew point of the solvent by means of the coolant flowing through the heat exchanger 34. Because, as already mentioned above, the dew point is comparatively high owing to the concentration of the solvent, the corresponding cooling of the peripheral walls of the heat exchanger tubes 29 is not a problem.

Owing to the shaping of the peripheral walls of the heat exchanger tubes 29, eddies are additionally produced in the solvent- and paint-laden air flowing through the tubes, which eddies throw the relatively heavy paint particles against the peripheral walls, where they adhere. They there combine with the solvent separated out as a result of the cooling action and are accordingly able simply to flow downwards under the influence of gravity into the pipe 17, from where they pass into the first lacquer container 18.

Depending on the type of paint, it may be that paint and/or paint particles remain adhered to the peripheral walls of the heat exchanger tubes 29, as a result of which the heat exchanger tubes 29 may become clogged over time. In that case, the heat exchanger tubes 29 are freed of such paint residues by separate cleaning operations, for example by flushing with a suitable solvent. Such cleaning operations can be carried out at regular time intervals, as appropriate.

In this manner, the air flowing through the branch pipe 20 is already largely cleaned of paint, and the concentration of the solvent is reduced. An after-cleaning operation then takes place in the electrostatic after-filter 21. To that end, the paint particles are ionised by means of the corona wire 46 and then attracted to the inside lateral surface of the housing 43 by the electric field present between the corona wire 46 and the metal housing 43 of the electrostatic after-filter 21. The paint is deposited on the inside lateral surface and can again flow under the influence of gravity into the second lacquer container 23 by way of the pipe 22. The amounts of paint deposited on the one hand in the combination separator 16 and on the other hand in the electrostatic after-filter 21 are deliberately not guided into the same paint container but into two different paint containers 18, 23, because the corona generated by the corona wire 46 results in the paint's reacting to a certain extent, so that the paint collecting in the paint container 23 may contain a certain amount of cured paint particles. These must be separated off by suitable measures, for example by filtration, before the paint obtained there is re-used.

On account of the cooling action of the heat exchanger tubes 29 in the combination separator 16, the air leaving the electrostatic after-filter 21 is at a temperature below the temperature that prevails in the spray booth 2 and that is necessary for the painting operation. By means of the heating device 39, therefore, the heat removed in the combination separator 16 by means of the coolant flowing therein is substantially returned to the air that is returned to the spray booth 2. In this manner, the air returned by way of the pipe 9 to the air plenum 7 and from there to the interior of the spray booth 2 again reaches the temperature necessary for painting, for example 22° C., without a great energy loss.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for painting objects comprising:
a) a spray booth in which a paint is applied to objects;
b) a device which generates a stream of a fluid which passes through the spray booth from a top to a bottom and which receives overspray produced during a painting operation and, where appropriate, solvent;
c) a recovery system for recovering the overspray and, where appropriate, solvent, wherein
the recovery system comprises at least one vertical tube comprising a continuously extending peripheral tube-wall, wherein fluid that is guided out of the spray booth and laden with overspray and solvent is configured to flow through the at least one vertical tube, the at least one vertical tube having a surface provided with elevations and/or depressions so that eddies are formed in the fluid flowing through the tube and the paint overspray is deposited on the peripheral tube-wall and flows downward out of the at least one vertical tube, and
the fluid is configured to flow top down within the interior through the at least one vertical tube.

2. The system of claim 1 wherein, the tube is configured to be cooled below a temperature that corresponds to a dew point of a solvent in the fluid flowing through the tube, so that the solvent condenses on the peripheral wall of the tube and, together with the overspray, flows downwards out of the tube.

3. The system of claim 2 wherein, a concentration of solvent in the fluid flowing through the tube is chosen such that the dew point of the solvent is above a freezing point of water.

4. The system of claim 3 wherein, the solvent concentration is over 30 g per standard cubic meter when using butyl acetate and over 10 g per standard cubic meter when using xylene.

5. The system of claim 2 further comprising: a heat pump which cools the fluid flowing through the tube and heats cleaned fluid before the cleaned fluid is returned to the spray booth.

6. The system of claim 1 further comprising: an electrostatic after-filter for pre-cleaned fluid is provided downstream of the tube through which fluid can flow.

7. The system of claim 6 further comprising: separate paint containers are provided for the overspray obtained in the tube and the overspray obtained in the electrostatic after-filter.

* * * * *